Sept. 16, 1969   J. BELART   3,467,227
BRAKE SYSTEM WITH WEAR-COMPENSATED MEANS
Filed July 21, 1967
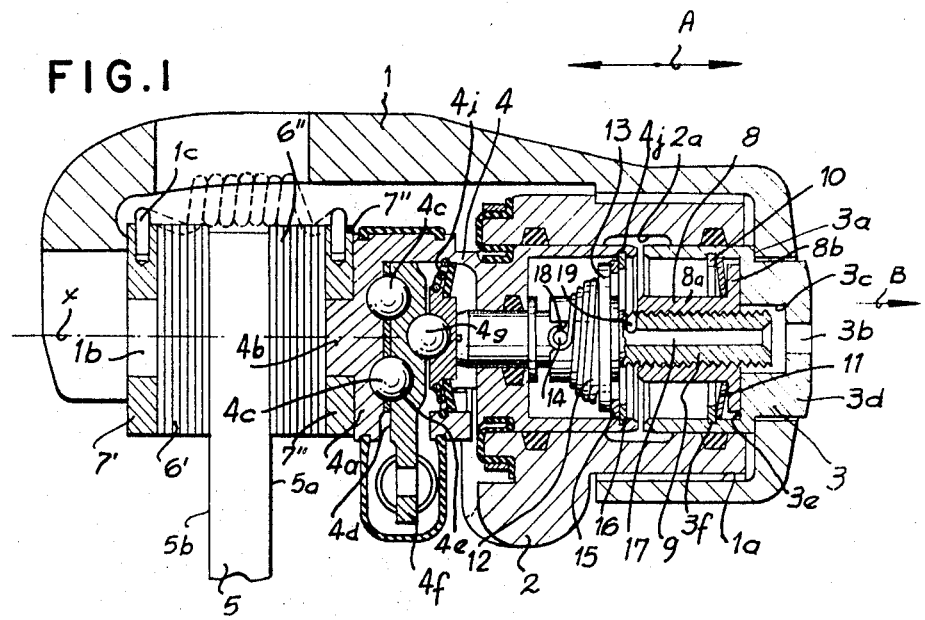
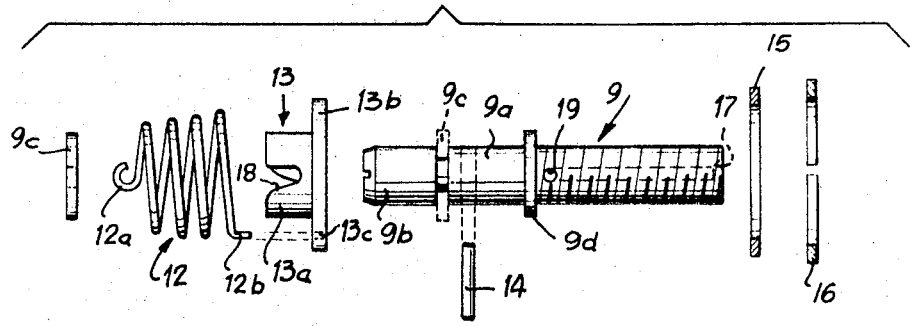
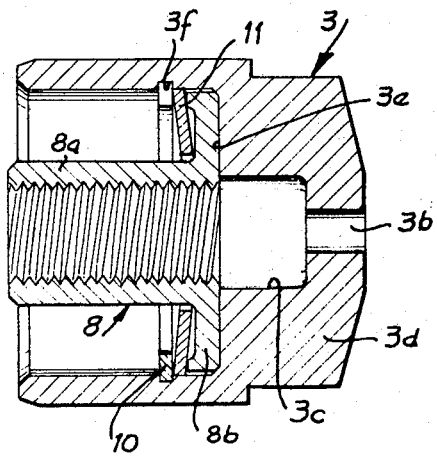
JUAN BELART
INVENTOR.
BY Karl J. Ross
Attorney

United States Patent Office 3,467,227
Patented Sept. 16, 1969

3,467,227
BRAKE SYSTEM WITH WEAR-COMPENSATED MEANS
Juan Belart, Walldorf, Germany, assignor to Alfred Teves Maschinen- und Armaturenfabrik K.G., Frankfurt am Main, Germany, a corporation of Germany
Filed July 21, 1967, Ser. No. 655,150
Claims priority, application Germany, Aug. 23, 1966, T 31,887
Int. Cl. F16d 65/40; B60t 17/00
U.S. Cl. 188—196                    10 Claims

ABSTRACT OF THE DISCLOSURE

A brake system for hydraulic vehicle brakes in which a piston is axially shiftable in a cylinder and is provided with automatically operable self-adjusting mechanism for re-establishing the rest position of the piston to compensate for increased brake play with wear of the brake lining wherein an elastically deformable member, e.g., a dished-disk spring, is provided between the mechanism and one of the brake members for compressive accommodation of the brake force for limiting the self-adjustment of the mechanism at braking force exceeding a predetermined level.

---

My present invention relates to hydraulic vehicle brakes and, more particularly, to hydraulic brake systems having piston-and-cylinder arrangements provided with a self-adjusting mechanism for repositioning the piston upon wear of the brake lining.

It has already been proposed to provide so-called self-adjustment mechanisms in vehicle brakes and the like whereby the piston member is automatically reset with respect to its rest position to re-establish a predetermined brake play upon wear of the brake lining. Such systems for the compensation of brake-lining wear may operate in various ways. In one case, each brake actuation resets the rest position of the brakeshoe by accommodating a restoring movement which is always a predetermined amount less than the original stroke, a follower being provided to prevent complete return of the brakeshoe or piston. In another arrangement, the follower is advanced only when the brakeshoe is displaced beyond a predetermined amount corresponding to the normal brake play. In the first of these systems, it has been found that difficulties are often encountered because of excessive adjustment of the rest position of the brake; in some cases, this rest position is advanced to the point that the brakeshoe frictionally engages the braking surface (e.g., disk or drum) even when the brake is released. In the second system, it is difficult to maintain a constant brake play within relatively small tolerances.

An especially significant disadvantage of both systems is that, especially in disk-brake arrangements in which the hydraulic means is provided in a yoke disposed along the periphery of the brake disk, excessive braking force may cause distortion of the brake support (e.g., the yoke), the disk or the means of fixing the disk or yoke to the remaining parts of the vehicle. In such cases, a brake play develops which is a consequence of this distortion and provides a false indication of the actual lining wear. Readjustment of the brakeshoes by a corresponding extent will invariably cause difficulties when the brake is released.

It is, therefore, an important object of the present invention to provide an improved brake arrangement of the egneral characteristics described wherein over- and under-adjustment of the brake is precluded.

Still another object of this invention is to provide a brake system of the general characteristics described which has effectively operating, inexpensive and simple self-adjusting means for compensating wear of the brake lining.

Yet a further object of my invention is to provide a self-adjusting mechanism for a vehicular brake system to avoid overadjustment of the brakeshoes upon the development of excessive braking force and corresponding mechanical stress or illusory brake play.

I have found that it is possible to avoid the aforementioned disadvantages and attain these objects by providing, in a brake system having a hydraulic piston-and-cylinder arrangement in which a piston member and another brake member are relatively repositioned upon axial movement by a self-adjusting mechanism to compensate for brake wear, between the mechanism and one of the members, an elastically deformable element which is substantially ineffective at normal brake force to permit self-adjustment of the rest position of at least one of the brakeshoes but is compressed upon development of excessive brake force of the type tending to cause illusory brake play, to relieve the mechanism and prevent overadjustment thereby.

According to a specific feature of this invention, the brake system which is provided with a pair of relatively displaceable piston members slidable in a common cylinder, has a threaded spindle anchored via the elastically compressible element to one of the pistons while the other piston is coupled with cam means cooperating with the spindle for stepping the latter with respect to a threaded sleeve bearing upon the first piston. This sleeve is frictionally held against the piston by a dished-disk spring which constitutes an elastically compressible element while the spindle is axially movable relatively to the piston and has a flange acting upon the other piston. Advantageously, the cam means is constituted by a pin anchored to the spindle and shiftable along an inclined camming surface of a sleeve retained by a further flange of the spindle but frictionally engageable to limit rotation of the sleeve by the other piston. A torsion spring is provided between this latter sleeve, which is freely rotatable on the spindle when the frictional engagement thereof with the other sleeve is relieved, to angularly restore the pin and the camming body to their original positions. Consequently, during normal brake operations the camming action permits rotation of the spindle relatively to the frictionally engaged camming body with threaded withdrawal of the spindle relatively to the sleeve retained by the elastically deformable dished-disk spring to reset the relative positions of the pistons at rest. When the full stroke of the adjusting mechanism is exceeded, further brake pressure merely compresses the spring without additional angular adjustment of the spindle so that the rest position cannot be changed as a result of illusory brake play resulting from stress of the forced transmitting member, e.g., the brake yoke. The force constant of the dished-disk spring is selected so that it acts as a rigid member during normal brake operations and is only compressible when the bending stresses arise. Advantageously, the spindle has a central channel communicating with a source of fluid pressure (e.g., the brake master cylinder) via the first pison and a radial bore communicating between this channel and the cylinder bore between the pistons. While the invention has been found to be especially advantageous with respect to so-called "floating-yoke" disk brakes, this principle is also applicable to drum-type brakes using outwardly displaceable arcuate brakeshoes and other types of disk brakes. Indeed, the relationship between the self-adjusting mechanism and the actuating means of the brake is equally satisfactory to mechanically operable brakes, e.g., those in which the brakeshoes are displaced by Bowden cables or the like.

The above and other objects, features and advantages of the present invention will become more readily apparent from the following description, reference being made to the accompanying drawing in which:

FIG. 1 is an axial cross-sectional view of the floating-yoke disk brake embodying the present invention;

FIG. 2 is an enlarged detail veiw of a portion of the brake in FIG. 1; and

FIG. 3 is an exploded view of another detail.

In the drawing, I show a disk brake whose yoke 1 is mounted on the chassis or body of the vehicle, e.g. upon the axle housing, with freedom of at least limited mobility transverse to the braking faces 5a and 5b of a disk 5 and parallel to the axis of rotation thereof, as represented by the arrow A. Angular entrainment of the yoke 1 by the disk is prevented in a conventional manner. The disk 5 is rotatably entrained by the wheel shaft or wheel hub of the particular wheel assembly of the vehicle and is axially fixed relative thereto.

The yoke 1 comprises a cylinder housing 2 of generally sleeve-like configuration which is axially shiftable in a cylindrical guide 1a of the yoke 1 and receives a pair of pistons 3 and 4. Piston 3 has a shoulder 3a which bears upon the yoke 1 in the direction of arrow B and is adapted to apply the reaction force of the brake-actuating pressure to this yoke 1 to draw a brakeshoe against the annular braking face 5b. This brakeshoe comprises a backing plate 7' mounted upon a stud 1b of the lefthand lobe of the yoke 1 and carrying a brake lining 6'. A spring 1c retains the brakeshoes in place. The other piston 4 acts upon the backing plate 7" of the other brakeshoe to apply its brake lining 6" against the braking face 5a of the disk. To this end, the brake-actuating means includes between the piston 4 and the braking plate 7", a nonrotatable force-transmitting member 4a whose axial extension 4b is received in the backing plate 7" and forms a seat for a plurality of camming balls 4c angularly equispaced about the axis X of the pistons. A camming disk 4d (see the commonly assigned copending application Ser. No. 585,877, filed Oct. 11, 1966, now U.S. Patent 3,392,806 of July 16, 1968) has corresponding ramps 4e accommodating the balls 4c and adapted, upon rotation of the disk 4d about axis X, to spread members 4a and 4d apart to press the brakeshoe 6", 7" against the disk 5. A remotely-controlled actuating member, such as a bowden cable, is affixed to the arm 4f of the disk 4d to rotate the latter and lock the brake. Thus, the assembly 4a through 4f form an emergency-, parking- or locking-brake force mechanically displacing the brakeshoes in the absence of hydraulic pressure. The disk 4d is journaled upon a further ball 4g disposed along the axis X and received in a pressed-bearing plate 4h centered with respect to the assembly 4, 4a by a spiral spring 4i.

Coaxially with the pistons 3, 4 and their common cylinder bore 2a, I provide a threaded bolt 9 which extends axially from the right-hand end of piston 3 at least into the region between the pistons 3 and 4 and which may be slidably received in a bore 3c of the boss 3d of piston 3. This boss is provided at 3b with a passage for delivering hydraulic fluid to the cylinder bore 2a between the pistons via an axially extending channel 17 concentrically provided in the threaded bolt 9 and terminating at the interior of the assembly in a radial bore 19 communicating with the chamber 2a. A sleeve 8 is threadedly mounted upon the bolt 9 and has a shank 8a coaxial therewith terminating short of the radial bore 19, while the flange 8b of sleeve 8 rests against the inner transverse surface 3e of piston 3.

The right-hand piston 3 is, moreover, provided along its inner cylindrical surface with a peripheral groove 3f in which a split-spring entrainment ring 10 is received to retain a dished-disk spring 11 resiliently against the flange 8b of sleeve 8. When the brake is actuated and hydraulic fluid fed into the system via passage 3b, channel 17 and bore 19, hydraulic pressure is applied in opposite axial direction to the pistons 3 and 4 to drive them away from one another. Piston 4 urges the brakshoes 6", 7" to the left against the disk 5, while piston 3 delivers reaction force in the direction of arrow B to the yoke 1, thereby drawing the brakeshoes 6', 7' against the disk 5. With normal braking force, the entrainment ring 10 carries the outer periphery of the dished-disk spring 11 to the right (arrow B) without a compression of the spring. This substantially noncompressive stressing of spring 11 to the right continues until the resilent force of spring 11 is increased to the point that it is pressed together and the sleeve 8 together with the bolt 9 no longer can be shifted to the right. The threshold or response force of spring 11 is so selected that a compression of the spring occurs initially only when the braking force is so high that the brakeshoe-retaining means, namely the yoke 1, or the force-transmitting means (when other types of force transmission between the hydraulic means and a brakeshoe are provided), is stressed approximately to the yield (bending) point.

During the period of normal brake force, the threaded bolt 9 moves to the right while the pin 14 rides along the inclined surface of slot 18 in the cylindrical portion of a flanged body 13, this pin being entrained by the bolt 9. The flanged body 13 frictionally engages an intermediate ring 15 which bears upon a spring ring 16 anchored in an annular groove 4j of the piston 4 to limit rotation of the body 13. Consequently, pin 14 is cammed angularly about the axis X as it is shifted to the right (arrow B) by the bolt 9 and this bolt is rotated against the force of a spiral torsion spring 12.

Because of the frictional contact of the flange 8be of sleeve 8 with the "second" piston 3, spirally under under the axial pressure of spring 11, this spring is nonrotatable so that the bolt 9 is threaded out of the sleeve 8 by the relatively angular and axial movement of the pin 14 and the flanged body 13 which together form a camming assembly, the pin 14 being coupled with the "first" piston 4 via the spindle 9, the sleeve 8, the spring 11 and the retaining ring 10, whereas the flanged body 13 is coupled with piston 4 via the retaining ring 14 and the friction disk 15.

As is apparent from FIG. 3, the flanged body 13 comprises a cylindrical portion 13a which surrounds the nonthreaded shank 9a of the spindle 9 and a transverse flange 13b which frictionally engages the ring 15 previously described. The spring 12 has a hooked portion 12a engaging the pin 14 and a stem 12b which is received in a bore 13c of the flange 13b. Spindle 9, moreover, has a forward face 9b against which the thrust bearing 4g, 4h rests and a flange 9c bearing upon the piston 4. A further flange 9d is axially spaced from the flange 9c and forms a stack for the body 13. The camming slit 18 in the cylindrical portion 13a of member 13 is designed to rotate the spindle 9 in the direction of arrow C as indicated earlier. Upon axial displacement of the pistons 3 and 4 in the opposite directions, the respective axial entrainment of member 9 and member 13 by these pistons effects rotation of spindle 9 in the direction of arrow C and slight withdrawal of the spindle from the sleeve 8. Upon release of the brake, the frictional engagement between the flange 13b of body 13 and the friction ring 15 is released whereupon the tension torsion spring 12 rotates member 13 to its original position relative to the pin 14 about the spindle 9. Since flange 9c retains piston 4 in its new axial rest position relative to piston 3, a self-adjustment of the device to compensate for brake wear has been carried out. The restoration of the original relative position of the camming elements 13 and 14 permits repeated self-adjustment through the entire thread length of spindle 9.

A particularly advantageous characteristic of this invention resides in the fact that, during normal brake operations, when only the usual brake play must be taken up by the piston stroke and only normal brake forces are involved, the adjustment for brake-lining wear occurs automatically. When, however, excessive braking forces are applied and there is a tendency toward bending stress which may increase the apparent brake play, the dished-spring 11 is compressed to take up this excessive play and a false adjustment, which might lead to bending of the brake upon release, is avoided.

I claim:

1. In a disk-brake system having at least one brakeshoe member shiftable toward a braking face of a brake disk, at least one piston member displaceable transversely to said face and operable to shift said brakeshoe member, a support member retaining said brakeshoe member and piston member, and a self-adjusting mechanism interposed between two of said members and including a threaded spindle coaxial with said piston member for re-establishing a rest position of one of said members to compensate for wear of the brakeshoe member, the improvement which comprises a resiliently deformable dished disk-spring between said mechanism and one of said two members and coaxial with said spindle, said spring being ineffective in limiting the actuation of said self-adjusting mechanism but operative, upon the application of excessive brake force to said brakeshoe member, for limiting further actuation of said mechanism.

2. In a brake system having at least one brakeshoe member shiftable toward a braking face, at least one movable actuating member displaceable operable to shift said brakeshoe member, a support member retaining said brakeshoe member and said actuating member, and a self-adjusting mechanism interposed between two of said members for re-establishing a rest position of one of said members to compensate for wear of the brakeshoe member, the improvement which comprises a resiliently deformable element between said mechanism and one of said members ineffective in limiting the actuation of said self-adjusting mechanism but operative, upon the application of excessive brake force to said brakeshoe member, for limiting further actuation of said mechanism, said actuating member including a piston adapted to act upon said brakeshoe member and said support member including a brake support forming a cylinder for said piston and having a surface transverse to the direction of movement of said piston, said self-adjusting mechanism including a threaded spindle axially and rotatably shiftable in said cylinder, a threaded sleeve engaging said spindle, and camming means between said spindle and said piston for rotating said spindle relatively to said sleeve upon relative axial displacement of said spindle and said piston, said resiliently deformable element bearing upon said sleeve and urging same into frictional engagement with said surface.

3. The improvement defined in claim 2 wherein said brake system includes a pair of brakeshoes jointly displaceable toward respective braking faces, the first-mentioned piston bearing upon one of said brakeshoes, said cylinder receiving a second piston axially shiftable relatively to the first piston and in force-transmitting relationship with the other brakeshoe, said second piston forming said surface.

4. The improvement defined in claim 3 wherein said spindle extends axially through said piston and is generally coaxial therewith.

5. The improvement defined in claim 4 wherein said spindle is provided with an axial channel communicating with a source of hydraulic fluid under pressure, and with a radial bore communicating between said channel and said cylinder intermediate said pistons.

6. The improvement defined in claim 3 wherein said sleeve has a cylindrical threaded portion engaging said spindle and an outwardly extending flange overlying said surface within said second piston, said resiliently deformable element being constituted as a dished-disk spring surrounding said sleeve portion and bearing axially on said flange in the direction of said surface while peripherally engaging said second piston.

7. The improvement defined in claim 6 wherein said spindle has a flange remote from said surface engaging said first piston, said camming means including a transverse pin anchored to said spindle, a camming body rotatably mounted upon said spindle and cooperating with said pin for rotating said spindle relatively to said body upon relative axial displacement of said body and said pin, restoring means interconnecting said spindle and said body for angularly displacing said body to return said pin and said body to an original position, and means for frictionally rotating said body in engagement with said first piston during relative axial displacement of said body and said spindle whereby the rotation of said body is impeded.

8. The improvement as defined in claim 7 wherein said restoring means includes a torsion spring interconnecting said body and said pin.

9. The improvement as defined in claim 7 wherein said first and second pistons are respectively provided with split rings respectively entraining said body and said dished-disk spring.

10. The improvement as defined in claim 7 wherein said brake system support is a disk-brake yoke extending about the periphery on the brake disk and carrying said brakeshoes.

References Cited

UNITED STATES PATENTS 3,010,544 11/1961 Dahle et al.
3,213,970 10/1965 Dombeck et al.

DUANE A. REGER, Primary Examiner

U.S. Cl. X.R.

188—73